US009585029B2

United States Patent
Agarwal et al.

(10) Patent No.: US 9,585,029 B2
(45) Date of Patent: Feb. 28, 2017

(54) START-UP SEQUENCE AND CONFIGURATION FOR A RADIO NODE

(71) Applicant: Parallel Wireless, Inc., Nashua, NH (US)

(72) Inventors: Kaitki Agarwal, Westford, MA (US); Rajesh Kumar Mishra, Westford, MA (US); Sumit Garg, Hudson, NH (US); Pratik Mehta, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 267 days.

(21) Appl. No.: 14/211,355

(22) Filed: Mar. 14, 2014

(65) Prior Publication Data

US 2014/0269423 A1    Sep. 18, 2014

Related U.S. Application Data

(60) Provisional application No. 61/793,351, filed on Mar. 15, 2013.

(51) Int. Cl.
*H04W 24/02* (2009.01)
(52) U.S. Cl.
CPC .................................. *H04W 24/02* (2013.01)
(58) Field of Classification Search
None
See application file for complete search history.

(56) References Cited

U.S. PATENT DOCUMENTS

| 8,307,097 B2 | 11/2012 | Bovo et al. |
| 2002/0123365 A1* | 9/2002 | Thorson ............... H04W 88/08 455/524 |
| 2005/0153725 A1 | 7/2005 | Naghian et al. |
| 2009/0040985 A1 | 2/2009 | Barnawi et al. |

(Continued)

FOREIGN PATENT DOCUMENTS

| WO | 2011092698 A1 | 8/2011 |
| WO | 2011137118 A1 | 11/2011 |

OTHER PUBLICATIONS

3rd Generation Partnership Project, 3GPP TS 32.593 v11.0.0 (Sep. 2011), "3rd Generation Partnership Project; Technical Specification Group Services and System Aspects; Telecommunication management; Home enhanced Node B (HeNB) Operations, Administration, Maintenance and Provisioning (OAM&P); Procedure flows for Type 1 interface HeNB to HeNB Management System (HeMS) (Release 11)," 3rd Generation Partnership Project, Sep. 2011, V11.0.0.

*Primary Examiner* — Ayaz Sheikh
*Assistant Examiner* — Sori Aga
(74) *Attorney, Agent, or Firm* — Michael Y. Saji

(57) ABSTRACT

In this invention we disclose methods of automatically configuring a wireless node when it initially powers on and seeks to integrate into an existing wireless network. The wireless node could be part of an ad hoc, software defined network. One such network could be LTE network. The auto-configuration methods disclosed herein can be executed on wireless nodes throughout their operation. In alternate embodiments, the methods disclosed could be used to create a new configuration based on changed environmental conditions, location or node capability change. These embodiments allow wireless nodes to migrate to better quality connections if they become available.

16 Claims, 4 Drawing Sheets

(56) References Cited

U.S. PATENT DOCUMENTS

| | | |
|---|---|---|
| 2010/0142403 A1 | 6/2010 | Baumgarth et al. |
| 2010/0172272 A1* | 7/2010 | Tenny .................. H04W 24/00 |
| | | 370/280 |
| 2011/0004747 A1* | 1/2011 | Venkatachalam ....... H04L 12/66 |
| | | 713/2 |
| 2012/0106464 A1 | 5/2012 | Ma et al. |
| 2012/0106468 A1 | 5/2012 | Engström et al. |
| 2013/0044028 A1* | 2/2013 | Lea ........................ H01Q 21/24 |
| | | 342/359 |
| 2013/0157656 A1 | 6/2013 | Gao et al. |
| 2013/0225168 A1 | 8/2013 | Singh et al. |

* cited by examiner

START-UP SEQUENCE AND CONFIGURATION FOR A RADIO NODE

CROSS-REFERENCE TO RELATED APPLICATIONS

This application claims priority to the following U.S. Provisional Patent Application No. 61/793,351 entitled "Start-up sequence and configuration for radio node" filed Mar. 15, 2013," the entire contents of which are hereby incorporated by reference.

FIELD

The present invention relates generally to wireless multimedia telecommunications. More specifically, this invention relates to auto-discovery and start-up procedures for wireless radio nodes.

BACKGROUND

When a new network node is installed in a wireless communication network, it must be configured to fit within the network. In most instances, network nodes have some pre-configured information stored within their memories. When they are powered on during installation, they typically go through a start-up sequence. The start-up sequence is designed to take a new node from its initial powering up to being a fully functioning node within a network. The start-up sequence typically requires the new node to discover itself, its peers, its neighbors, its master, its location, its network, its attachment, and hundreds of other properties about itself and its environment well known to those of skill in the art.

After this discovery process, the new node ideally joins an existing network, which requires authentication. Authentication itself involves the new node providing information about itself including its state, its capabilities, its identifying data, knowledge exchange capabilities, its configuration, identifying information about its software, and so forth. Although many in the art follow these general principles, the incantations used to reach the desired result are widely varied in terms of node discovery, the protocols used, the roles of the various nodes and network entities and so forth. It is still the case that node configuration and start-up sequences are not optimized.

In the prior art, most of the configuration data for a node was entered at the manufacturing site according to information provided by the network operator controlling the network into which the node would ultimately be installed. When the operator installed the node, he or she added additional, site-specific configuration information. In this way, network nodes were largely preconfigured by node manufacturers. This method of configuring a new node is costly and requires precise tracking because, if a node preconfigured for a certain location ends up being installed at another location, the technician installing the node has to manually perform reconfiguration from scratch.

More recently, auto-configuration methods have reduced the amount of time required to configure new nodes. When an auto-configuration module is executed, it makes certain assumptions about the node to be configured and the network into which it is assimilating. First, it is assumed that the new node has a secure and dedicated connection to a next-hop neighbor. Second, nodes are either statically preconfigured for a particular location, or they have the ability to connect to a server that can facilitate configuration. When a node is pre-configured, it has most of the information that it needs to integrate into a network, but not all. Accordingly, the operational expenditure for installing the node can be high because experienced technicians have to install the node and complete the configuration process. In addition, pre-configured nodes are designed to be deployed at a particular location. If that location changes, the nodes must be reconfigured.

When a node obtains its configuration information by contacting a server, it uses, for example and without limitation, a dynamic host configuration protocol ("DHCP") or a domain name server ("DNS") or both to establishes a secure connection with an initial server, which could called "InitMaster." If the node uses DNS, it performs a DNS query using a preconfigured IP domain for the server to obtain the IP address for the server. The secure connection could be made using IPSec or other well-known connection techniques.

After the node has established a secure connection, it provides its location and capability information, which may include information related to its hardware configuration, to the server. Having received this information, the server would determine whether it would serve the node or whether it should provide information sufficient for the node to establish a connection with another server, which could be called "ServMaster."

From there, the node could again provide location and capability information to the ServMaster. The ServMaster could, in turn, provide the remaining configuration information needed for the node to integrate into the network. This remaining configuration information could be preset or dynamically generated. At this point, the node is configured and ready to operate within the network.

As previously stated, these auto-configuration processes are for wired nodes. Auto-configuration for wireless nodes is more complicated because the new node has to choose a next-hop node, which often means choosing from more than one potential next-hop node. Once it has chosen a next-hop node, it must establish a trusted connection between itself and that node before it tries to establish a connection with the InitServer. Ideally, wireless nodes would not be pre-configured in terms of the role they play within a network because that would allow them to be flexible and to adapt to network conditions in a real-time way. There is, therefore, a need to allow wireless nodes to utilize an auto-discovery mechanism that allows other network nodes to discover new nodes as they are powered on. When the new node is powered on, it can automatically be configured to join an existing network.

SUMMARY OF THE INVENTION

In this invention we disclose methods of automatically configuring a wireless node when it initially powers on and seeks to integrate into an existing wireless network. This wireless node consists of wireless backhaul and provides multiple access technologies in the network. The wireless network could be LTE, LTE-A, Wi-Fi or WCDMA. The auto-configuration methods disclosed herein can be executed on nodes throughout their operation, as opposed to just upon initial power up, so that nodes can migrate to better quality connections if they become available.

DETAILED DESCRIPTION

In embodiments of the present invention, a node can auto-detect its role within a network, i.e., is the node a mesh node or a wired node? If it is a wired node, it could use industry best practices to auto-configure. An example of one such best practice could be 3GPP Standard TS 32.593 V11.0.0 (2100-09). If the node is wireless, in embodiments, it could scan its neighborhood to locate, authenticate, and connect to the best available wireless peer. From there, it could use its peer-discovery capabilities to discover the rest of the network and to obtain an IP address for the InitServer. After the new node has the address for the InitServer, it could communicate with the InitServer to determine if the InitServer will become its ServMaster or if it will be directed to connect with another server as its ServMaster. In an alternate embodiment, these new node could periodically reevaluate the available connections within its network to determine if it has optimal connectivity to the core network.

In an embodiment of the current invention, the wireless network could be an LTE, LTE-A, Wi-Fi or WCDMA network.

In embodiments described herein, nodes could be manufactured using production hardware and released software. These nodes would have a computer readable memory with the release software stored therein. They could also have a memory for storing any of the data obtained in performing any of the method steps disclosed herein. In an initial configuration process, manufacturers could store factory default, hard-coded configuration values within the nodes. At a second stage of manufacturing, called a staging process, the customer could add final configuration parameters that are specific to its network. Those of skill I the art will recognize that this is the staging process. During the staging process, minimal, additional configuration data can be stored in the wireless node's memory. The customer may create this additional configuration file using well known tools such as a command line interface or an element management system.

After this configuration information is stored within a wireless node, it could be installed into a network using embodiments of the present invention. In one embodiment, a wireless node will, upon power-up, run through its initial set of tasks including reading the configuration files. After it reads these files, it could begin executing the auto-configuration embodiments disclosed herein.

Figure 1A:
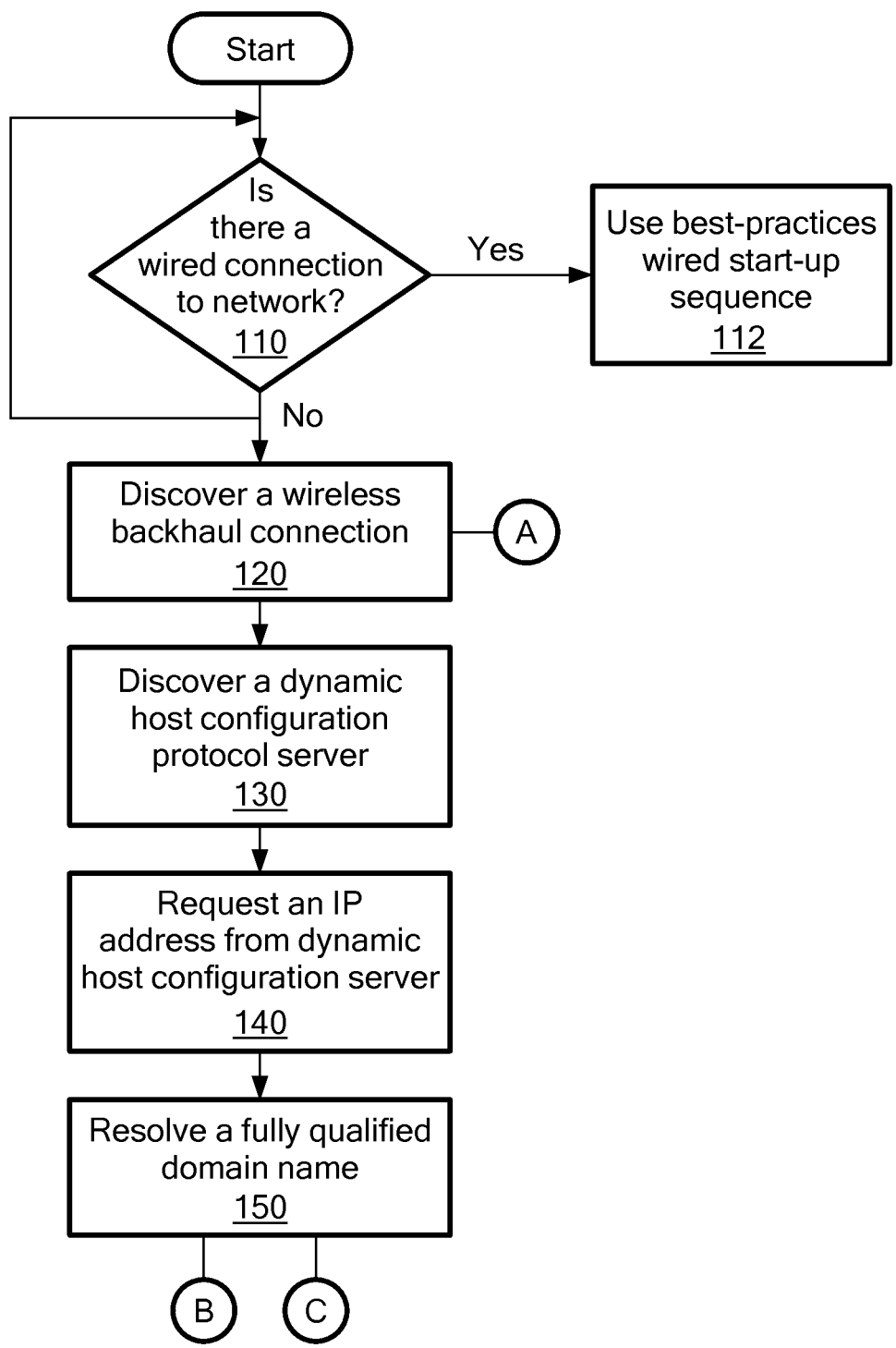
FIG. 1A is a diagram of method steps for performing a start-up sequence and a configuration for a wireless node.

A first such embodiment is shown in FIG. 1A. Using a neighborhood discovery process, the node determines 110 if it has a wired connection to a network, for example the core network or an existing wireless network. If it does, it uses 112 best practices for wired node configuration. If not, it discovers 120, as part of its neighborhood discovery process, a wireless backhaul connection.

Once the wireless node has established a wireless backhaul connection, it discovers 130 a dynamic host configuration protocol server, whereupon it can request 140 an IP address. Once the node has an IP address, it can resolve 150 a fully qualified domain name of a centralized server based on its geographical location. Finally, it can perform authentication. At this point, the node has been integrated into the existing network.

Figure 1B:
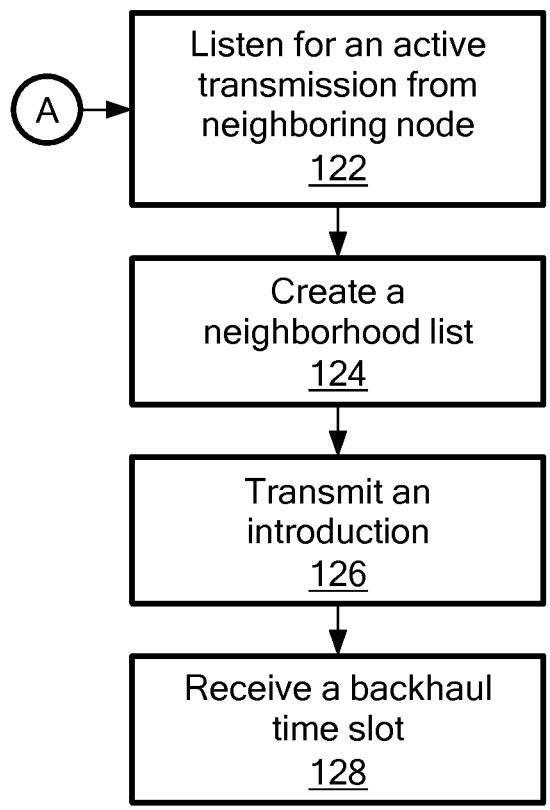
FIG. 1B shows the method steps of an additional embodiment directed toward discovering a wireless backhaul link.

In an alternate embodiment and with reference to FIG. 1B, the discovery 120 of the backhaul connection could further comprise listening 122 for an active transmission from a neighboring node. Each node in a wireless network broadcasts its one-hop neighbors. This allows the nodes within the network to create 124 and exchange neighborhood lists. Neighborhood lists contain information sufficient to identify each node within the neighborhood, but also information related to each node's capabilities. When the wireless node joins the neighborhood, it can transmit 126 an introduction over a control channel. The wireless node may optionally include information related to neighboring nodes that it may have detected. Once it does this, it will receive 128 a backhaul timeslot from a managing entity such as a centralized server or another node fulfilling a managerial role within the network.

Figure 1C:
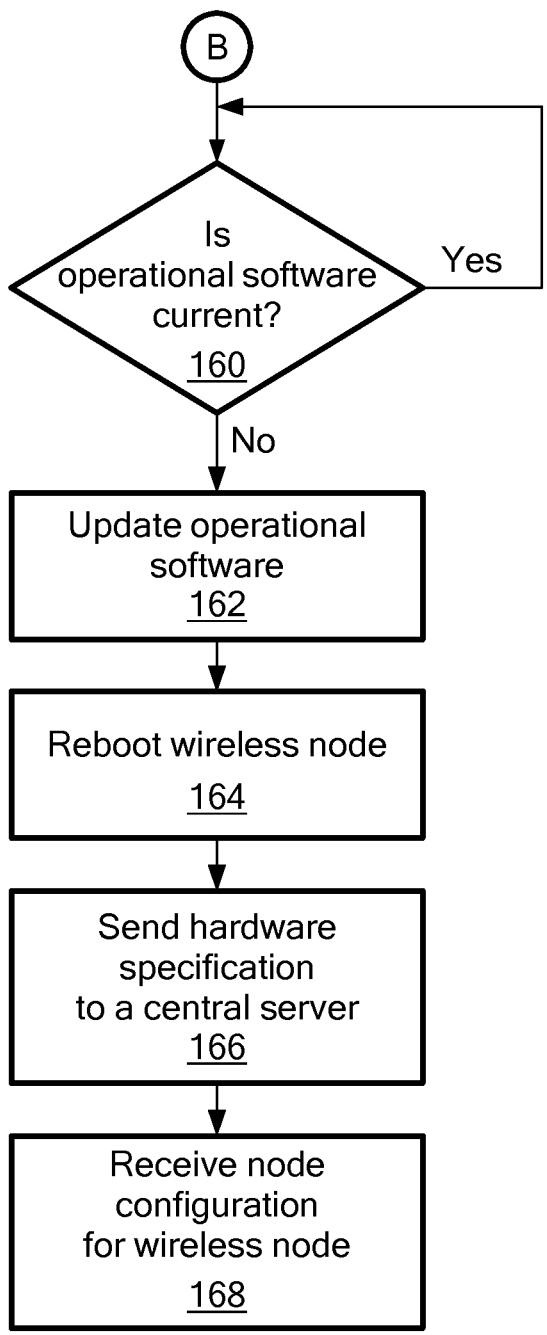
FIG. 1C shows method steps for embodiments directed toward determining if the operational software within a wireless node is current.

In some embodiments it is possible to verify whether the operational software stored in the wireless node is current. Turning to FIG. 1C, this could be done by analyzing 160 the present operational software within the wireless node to determine if it is the most currently available operational software. One way to determine what is the most current version of operational software is to poll all neighboring nodes regarding their operational software. Additionally, operational software versions may be something that is stored in a neighborhood list. If the operation software is current, there is no further action. If, however, the operational software is not current, a neighboring node could provide 162 an updated version of the operational software to the wireless node if the version it presently has is not the most current.

Once the wireless node has the most current operational software, it will automatically reboot 164. When it powers up and rejoins the network, it will transmit 166 one or more hardware capabilities to the centralized server. Some examples, without limitation, of hardware capabilities are radio characteristics, frequency protocol and duplexing capabilities, power levels, antenna characteristics, and the like. In response, the centralized server will send, and the wireless node will receive 168 a node configuration from the centralized server.

In an alternate embodiment, after the wireless node has resolved 150 a fully qualified domain name, it could download a system configuration. InitServer dynamically generates the wireless node configuration by, in one embodiment, discovering the wireless node's capabilities, its location, and the environment in which it is operating. After this is done, the InitServer generates the configuration and pushes it down to the wireless node.

In yet an alternate embodiment, after the wireless node resolves 150 a fully qualified domain name, it could broadcast a node ID on a contentions slot of a backhaul layer 1. In an alternate embodiment, the wireless node could select a second centralized server based on the load characteristics or geographic location of the centralized server to which it is connected.

Alternatively, after resolving 150 a fully qualified domain name, the wireless node could measure and store a network condition. Network conditions could be, without limitation, radio frequency, mobility, network load, network configuration, access configuration, backhaul configuration, interference, or power level.

Figure 1D:
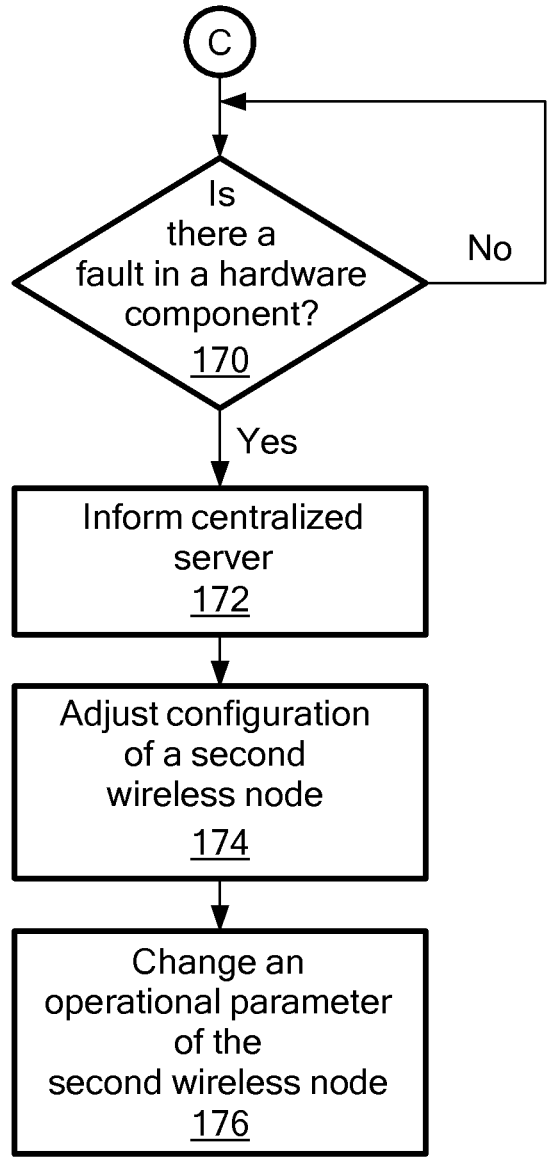
FIG. 1D shows the steps of embodiments directed toward overcoming a hardware fault within a wireless node.

In some circumstances, the a wireless node may experience a hardware failure, in which case nodes within the network would ideally adjust their parameters in order to compensate for the wireless node experiencing a hardware failure. In this embodiment, shown with reference to FIG. 1D, the wireless node could periodically determine 170 if it is experiencing an internal hardware failure. If it is, it could inform 172 the centralized server of the failure. The centralized server, or some other managing entity even perhaps a node within the network that has assumed a management role, could instruct a second node to adjust 174 one or more of its configurations and to change 176 one of its operational parameters. Operational parameters could be, without limitation, transmit power, transmit frequency protocol or duplexing scheme.

The foregoing discussion discloses and describes merely exemplary embodiments of the present invention. In additional embodiments, the methods described herein can be stored on a computer readable medium such as a computer memory storage, a compact disk (CD), flash drive, optical drive, or the like. Further, the computer readable medium could be distributed across memory storage devices within multiple servers, multi-RAT nodes, controllers, computing cloud components, mobile nodes, and the like. As will be understood by those skilled in the art, the present invention may be embodied in other specific forms without departing from the spirit or essential characteristics thereof. For example, wireless network topology can also apply to wired networks, optical networks, and the like. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology.

What is claimed is:

1. A computer implemented method of performing a start-up sequence and a configuration for a wireless node comprising the steps of:
   determining if a wireless node has a wired connection to a network;
   discovering a wireless backhaul connection;
   discovering a dynamic host configuration protocol server;
   requesting an IP address from the dynamic host configuration protocol server;
   resolving a fully qualified domain name of a centralized server based on geographical location;
   authenticating the wireless node;
   creating, at the wireless node, a neighborhood list identifying each node in the neighborhood of the wireless node, and including capability information for each neighbor node;
   broadcasting, at the wireless node, the neighborhood list for nodes newly joining the network over a control channel; and
   exchanging, at the wireless node, the neighborhood list with another node on the network.

2. The computer implemented method of claim 1 wherein the discovering a wireless backhaul connection further comprises the steps of:
   a. listening for an active transmission from a neighboring node;
   b. creating a neighborhood list based on a one-hop neighbor list transmitted by the neighboring node;
   c. transmitting an introduction over a control channel; and
   d. receiving a backhaul timeslot.

3. The computer implemented method of claim 1 further comprising the steps of:
   a. analyzing a present operational software version to determine if it is the most current operational software version;
   b. providing an updated version of the operational software to the wireless node if the wireless node does not have the most current version;
   c. rebooting the wireless node;
   d. receiving a hardware capability of the wireless node from the centralized server; and
   e. receiving a node configuration for the wireless node from the centralized server.

4. The computer implemented method of claim 1 further comprising downloading a system configuration.

5. The computer implemented method of claim 1 further comprising broadcasting a node ID on a contention slot of a backhaul layer 1.

6. The computer implemented method of claim 1 further comprising selecting a second centralized server based on load characteristics or geographic location of the centralized server.

7. The method of claim 1 further comprising measuring and storing a network condition.

8. The method of 7 further comprising adjusting a self-configuration of the wireless node comprising the steps of:
   a. determining if there is a fault in a hardware component within the wireless node;
   b. informing the centralized server of the fault;
   c. adjusting a configuration of a second wireless node; and
   d. changing an operational parameter of the second wireless node.

9. A wireless node comprising a memory communicatively coupled to a processor having computer readable software stored within that when executed causes the processor to:
   determine if a wireless node has a wired connection to a network;
   discover a wireless backhaul connection;
   discover a dynamic host configuration protocol server;
   request an IP address from the dynamic host configuration protocol server;
   resolve a fully qualified domain name of a centralized server based on geographical location;
   authenticate the wireless node;
   creating, at the wireless node, a neighborhood list identifying each node in the neighborhood of the wireless node, and including capability information for each neighbor node;
   broadcasting, at the wireless node, the neighborhood list for nodes newly joining the network over a control channel; and
   exchanging, at the wireless node, the neighborhood list with another node on the network.

10. The wireless node of claim 9 further comprising computer readable software that when executed causes the processor to:
   a. receive an active transmission from a neighboring node;
   b. create a neighborhood list based on a one-hop neighbor list transmitted by the neighboring node;
   c. transmit an introduction over a control channel; and
   d. receive a backhaul timeslot.

11. The wireless node of claim 9 further comprising computer readable software that when executed cause the processor to:
   a. analyze a present operational software version to determine if it is the most current operational software version;
   b. store an updated version of the operational software if the wireless node does not have the most current version;
   c. reboot the wireless node;
   d. send a hardware capability of the wireless node to the centralized server; and
   e. receive a node configuration for the wireless node from the centralized server.

12. The wireless node of claim 9 further comprising computer readable software that when executed cause the processor to download a system configuration.

13. The wireless node of claim 9 further comprising computer readable software that when executed cause the processor to broadcast a node ID on a contention slot of a backhaul layer 1.

14. The wireless node of claim 9 further comprising computer readable software that when executed cause the processor to select a second centralized server based on load characteristics or geographic location of the centralized server.

15. The wireless node of claim 9 further comprising computer readable software that when executed cause the processor to measure and store a network condition.

16. The wireless node of claim 15 further comprising computer readable software that when executed cause the processor to:
   a. determine if there is a fault in a hardware component within the wireless node;
   b. inform the centralized server of the fault;
   c. adjust a configuration of a second wireless node; and
   d. change an operational parameter of the second wireless node.

* * * * *